United States Patent [19]

Malek

[11] Patent Number: 5,086,467
[45] Date of Patent: Feb. 4, 1992

[54] DUMMY TRAFFIC GENERATION

[75] Inventor: Charles J. Malek, Crystal Lake, Ill.

[73] Assignee: Motorola, Inc., Schaumburg, Ill.

[21] Appl. No.: 359,317

[22] Filed: May 30, 1989

[51] Int. Cl.$^5$ .......................... H04K 1/02; H04K 1/04; H04K 1/10

[52] U.S. Cl. .......................... 380/6; 307/234; 307/358; 380/9; 380/33; 455/1

[58] Field of Search .................. 380/6, 9, 33; 307/234, 307/358; 455/1

[56] References Cited

U.S. PATENT DOCUMENTS

| | | |
|---|---|---|
| 2,952,735 | 9/1960 | Weiss ................................ 380/19 |
| 4,145,716 | 3/1979 | Uemura et al. . |
| 4,454,543 | 6/1984 | Lund et al. . |
| 4,864,612 | 9/1989 | Mahajan ............................... 380/2 |

OTHER PUBLICATIONS

Whitfield Diffie and Martin E. Hellman, "Privacy and Authentication: An Introduction to Cryptography", vol. 67, No. 3, Mar. 1979.

*Primary Examiner*—Stephen C. Buczinski
*Attorney, Agent, or Firm*—John W. Hayes

[57] ABSTRACT

In a secure communication system, a method for generating dummy traffic to forestall cryptanalytic attack by traffic analysis. Both the dummy traffic signal and certain characteristics of the dummy transmissions, such as duration and inter-transmission delay, are derived from the same source.

15 Claims, 3 Drawing Sheets

DUMMY TRAFFIC GENERATION

TECHNICAL FIELD

This invention relates generally to secure communication systems and in particular to a method for foiling traffic analysis by unauthorized listeners.

BACKGROUND ART

Secure communication systems are well known. They are often used when it is desirable to prevent the dissemination of sensitive information to unauthorized persons.

Intelligence-gathering organizations often employ cryptanalysts who attempt to decipher the encrypted or cipher text information transmitted in secure communication systems. Although finding the encryption key so that cipher text messages may be deciphered and interpreted is the ultimate goal, there are other techniques through which useful information may be extracted from encrypted transmissions without actually deciphering the message signals.

Traffic analysis is one technique employed to gather useful information from a secure communication channel without subjecting the message traffic to the rigorous cryptanalytic attack generally required to find the proper encryption key. For example, by noting the time of day during which peak traffic occurs, a cryptanalyst may derive meaningful information concerning the organizations among which communication is occurring. A sharp increase in the amount of secure traffic being transmitted among covert organizations may indicate that an important intelligence-gathering operation is about to commence. Similarly, monitoring enciphered transmissions among corporate entities may give a cryptanalyst some indication concerning imminent business transactions such as takeovers, mergers or other major financial dealings.

Accordingly, a need arises for a method of foiling traffic analysis information-gathering tools used by unauthorized listeners.

SUMMARY OF THE INVENTION

According to the invention, an improvement is provided to a transmitter that transmits first message signals provided by a first signal source. The improvement comprises a second signal source for providing second message signals wherein the second signal source causes the second message signals to be provided to the transmitter when the first message signals are absent.

In general, these first message signals are encrypted voice messages or encrypted data signals. The second message signals, at least in part, represent dummy traffic.

In one embodiment, the second message signals themselves are used to determine when the second message signals are transmitted and how long these second message signal transmissions will last.

The second signal source is called a dummy traffic generator. The dummy traffic generator may be part of a repeater, which is a radio transceiver that receives signals on one frequency and retransmits these signals on another. A repeater is a communication unit generally designed to improve range in an RF communication system involving portable units, mobile units and fixed units.

The dummy traffic generator is capable of monitoring signals at the output of the repeater's receiver as well as any input that may be directed to the repeater from an associated control console. In the absence of signals from the receiver section of the repeater or from any console audio input, the dummy traffic generator transmits signals of its own in order to artificially increase the amount of traffic on the channel.

Because communication units for which encrypted traffic is legitimately intended generally employ "proper key detect" circuitry, the dummy traffic transmissions will not be heard by these legitimate users. Only cipher text properly encrypted with the appropriate algorithm and key variable will cause an unsquelched condition in communication units similarly equipped. Thus, the dummy traffic signals will not constitute an annoyance for these legitimate users.

In the preferred embodiment, a linear feedback shift register (LFSR) generates dummy traffic signals. If the LFSR is properly designed, the period will be very long. In other words, the sequence generated by the LFSR will not repeat itself for a very long time. Thus, the output signal of the LFSR will have noise-like characteristics very similar to that of encrypted information. Because of these noise-like properties, the output of the LFSR is often termed a pseudo-random sequence.

The pseudo-random sequence itself is ideally suited for determining both the duration and the inter-transmission delay of any dummy traffic signals. This may be accomplished by using the output of the LFSR to seed random variable generators, one of which may be used to select the duration of any dummy traffic transmission, and the other of which may be used to determine the inter-transmission delay, or time between transmissions. In order to more easily adapt dummy traffic generation to a specific traffic model, the random variable generators which produce the duration and delay values may be subject to user programmable limits.

In order to control the application of dummy traffic signals to the repeater's transmitter, as well as monitor the activity of the other signals that occur within the repeater, such as console audio and receiver output, a real time clock and control module is employed. In the preferred embodiment, the real time clock and control module, the LFSR, and the random variable generators are implemented in a commercially available microprocessor such as an MC68HC11, manufactured by Motorola, Inc. Of course, implementation may also be accomplished using discrete logic.

DETAILED DESCRIPTION OF THE INVENTION

Figure 1:
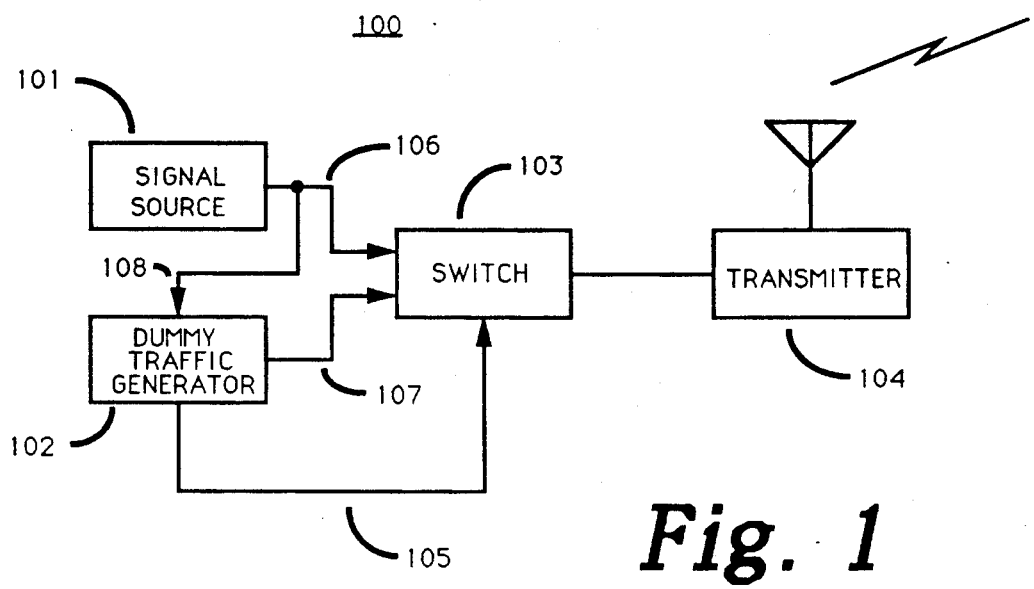
FIG. 1 shows a transmitter with first and second signal sources.

FIG. 1 illustrates a transmitter system generally depicted by the numeral 100. The transmitter system includes a first signal source (101) and a second signal source (102), which in this case is a dummy traffic generator. The signal source that provides signals to the transmitter (104) at any given time is determined by a switch (103). The switch (103) is directly controlled by the dummy traffic generator (102) via a control line (105).

In normal operation, the output (106) of the signal source (101) is directed through the switch (103) to the transmitter (104). The dummy traffic generator (102) may also monitor the output of the first signal source (101) via a secondary output line (108). The dummy traffic generator (102) may, from time to time, switch its own output (107) through the switch (103) to the transmitter (104). This process artificially increases the amount of traffic appearing on the communication channel, thus making it difficult for an unauthorized user to obtain any information concerning the nature of the message traffic by noting any sudden increases in traffic volume.

Figure 2:
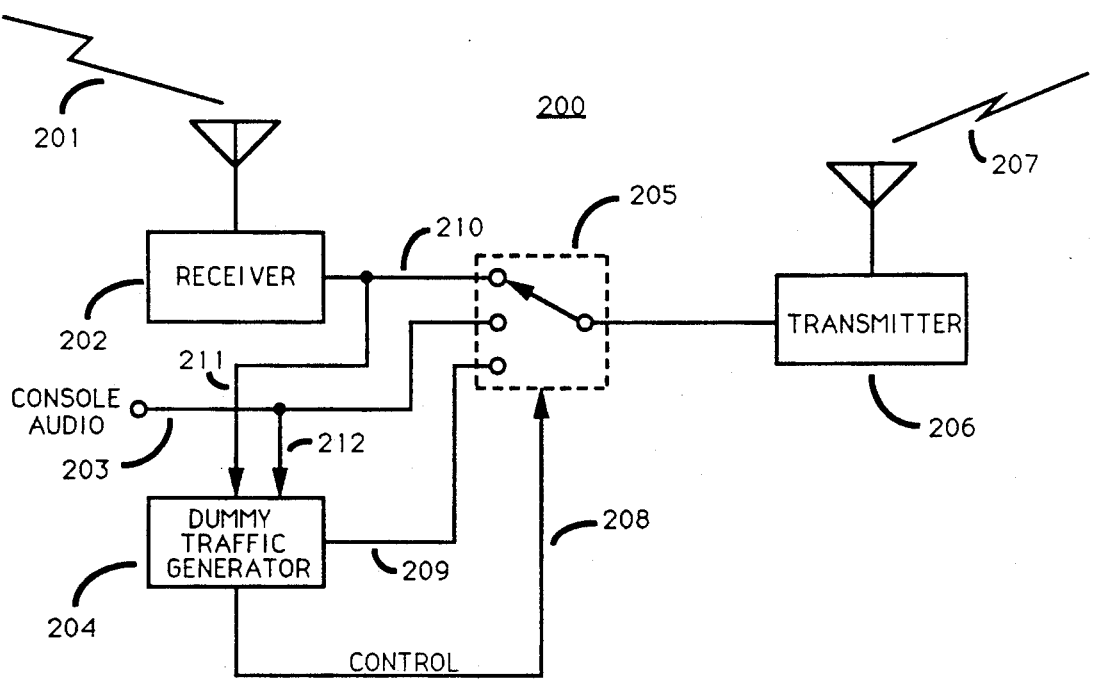
FIG. 2 depicts a repeater containing a dummy traffic generator module.

A repeater system is shown in FIG. 2 as generally depicted by the numeral 200. In normal operation, a switch (205) is positioned so that any information signal (201) being received by the receiver (202) could be directed via the receiver output (210) through the switch (205) to the transmitter (206) for retransmission as an information signal (207).

The repeater system (200) is also designed so that the operator of an associated console (not shown) can direct console audio via a console audio input (203) through the switch (205), and finally to the transmitter (206).

The dummy traffic generator (204) is able to monitor the output of the receiver (202) through a secondary output line (211) and the console audio through a secondary audio line (212). When no receiver output or console audio is present, the dummy traffic generator (204) generates signals of its own from time to time. These signals are coupled from the dummy traffic generator output (209) through the switch (205) and on to the transmitter (206). Control of the switch (205) is achieved by the dummy traffic generator through the switch control output (208).

Figure 3:
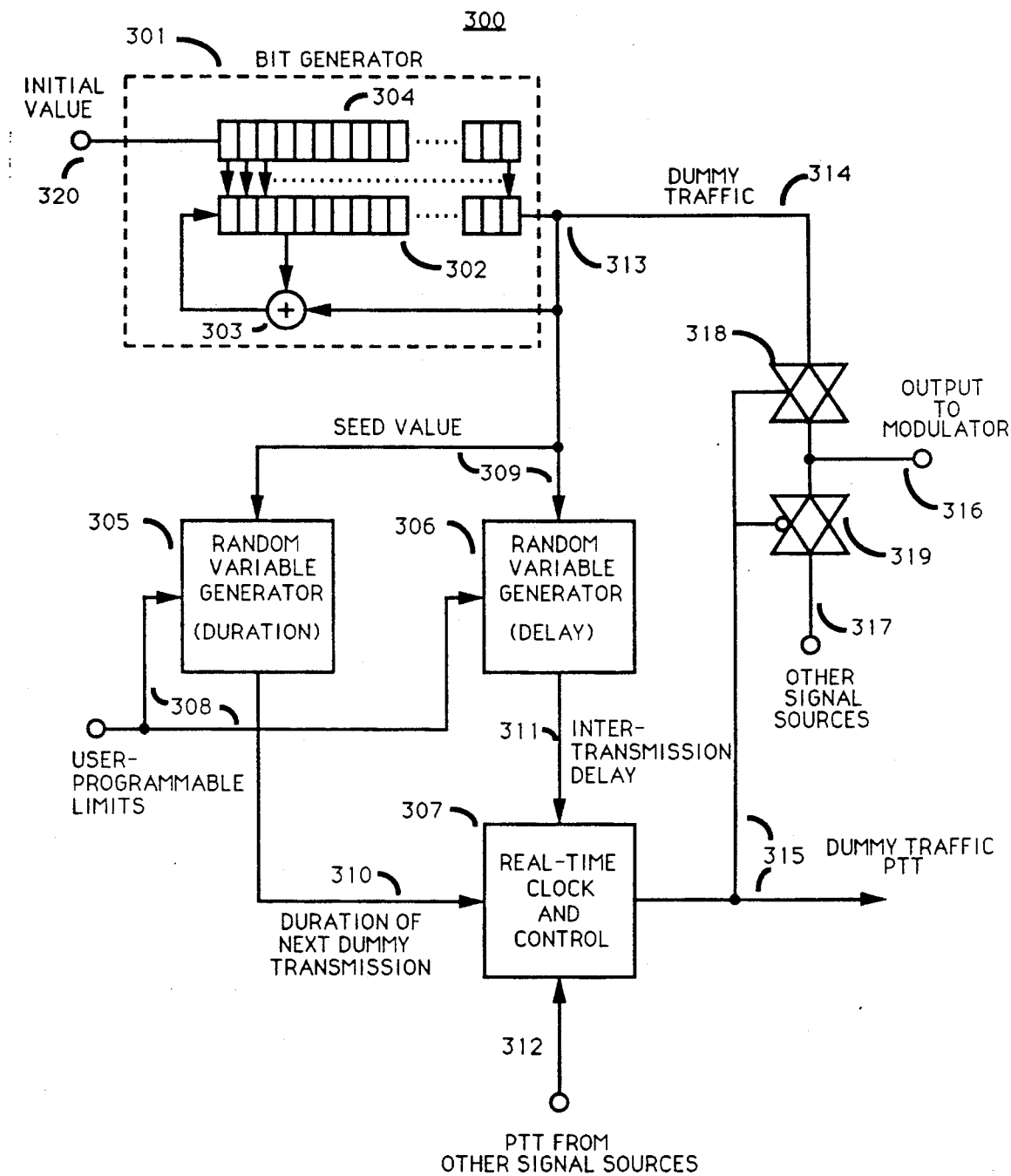
FIG. 3 is a detailed view of the components of a dummy traffic generator module.

A dummy traffic generator module as generally depicted by the numeral 300 can be seen in more detail in FIG. 3. The dummy traffic generator includes a bit generator (301).

The bit generator (301) is comprised of a shift register (302) with a series of taps coming from individual shift register stages. For the sake of clarity, only one such tap is shown here. These taps are added together in a modulo-2 adder (303) to form a linear feedback shift register (LFSR), as is well-known in the art. The bit generator is also equipped with an input register (304) through which the user may enter an initial value (320) or seed value for purposes of initializing the LFSR.

The output (313) of the bit generator (301) provides seed values for two RV (Random Variable) generators (305 and 306). These RV generators (305 and 306) operate on the pseudo-random seed values provided by the bit generator (301) by subjecting them to the constraints of user-programmable limits, in a manner to be described later. The user-programmed limits are provided to the RV generators through separate input lines (308). The first RV generator (305) provides a number corresponding to the duration of the next dummy transmission to a real time clock and control module (307) through a dedicated input line (310). A second RV generator (306) generates the inter-transmission delay, which is the amount of time between successive dummy traffic transmissions. This delay value is supplied to the real time clock and control module (307) through another input line (311).

The real time clock (RTC) and control module (307) monitors press-to-talk (PTT) signals from other signal sources over the PTT input line (312). The RTC and control module (307) asserts dummy traffic PTT (315) in order to control two analog switches (318 and 319).

The output (313) of the bit generator (301) is also provided to the input of one analog switch (318) in the form of the dummy traffic input (314). Other signal sources, such as encrypted voice or data, are applied to the other analog switch (319) through the input (317) dedicated to other signal sources. When the dummy traffic PTT signal from the RTC and control module is asserted, the first analog switch (318) connects the dummy traffic signal (314) to the switch output line (316) so that it may be directed to the modulator. In the event that the RTC and control module (307) detects PTT signals from other signal sources over the PTT input line (312), dummy traffic PTT (315) will be deasserted, thus deactivating the first analog switch (318) while activating the second analog switch (319) to allow the information signal from the other signal source to be applied to the modulator. The dummy traffic generator operates at the lowest level of priority; therefore, a dummy traffic signal may be gracefully pre-empted by actual traffic from one of the other signal sources.

Figure 4:
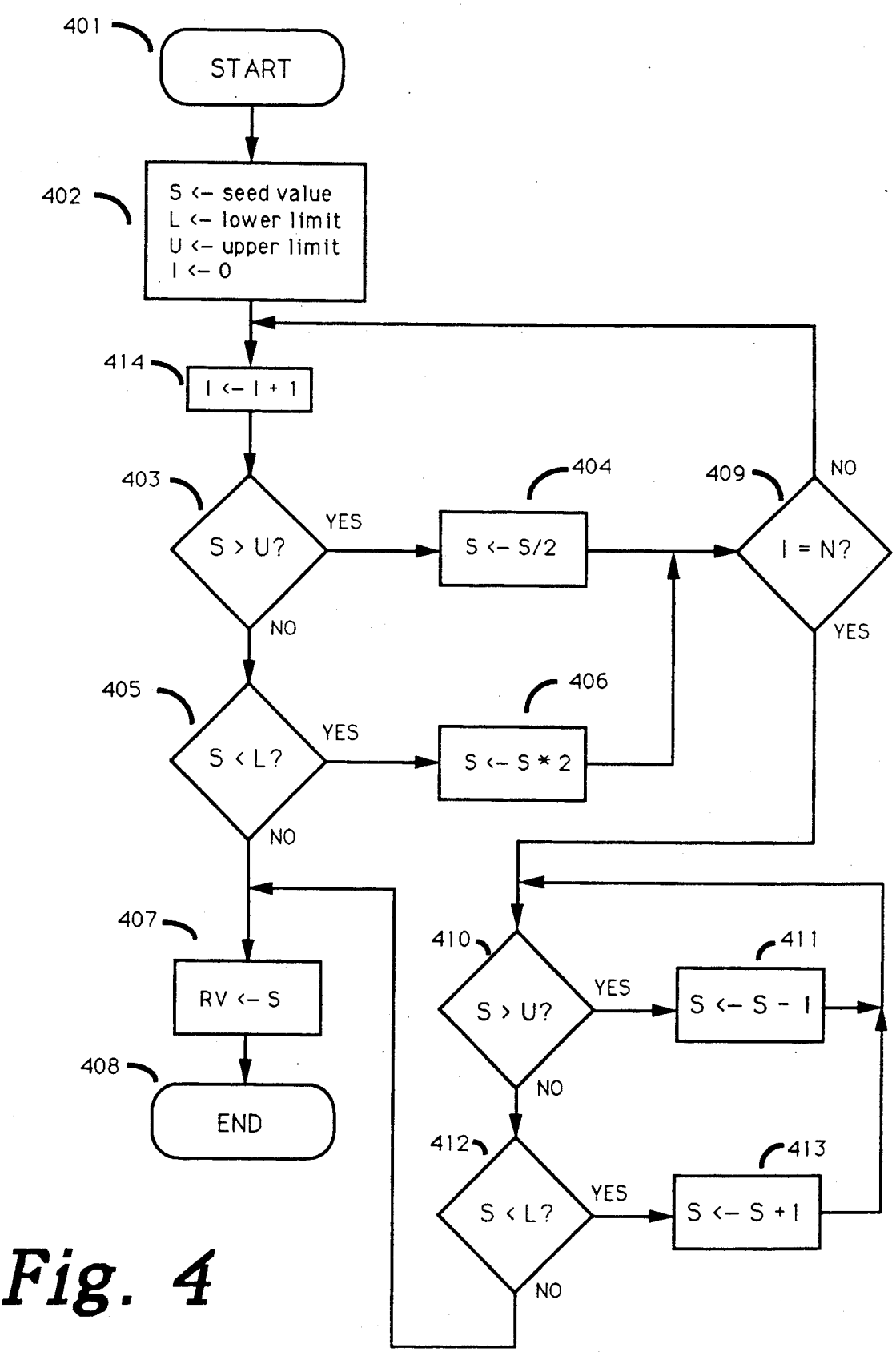
FIG. 4 is a flow chart of an algorithm used by a random variable generator of the present invention to condition a seed value according to user-programmed limits.

FIG. 4 is a flow chart of the algorithm used by an RV generator to condition the seed value provided by the LFSR. After the START state (401), several assignment operations are performed in block 402 to assign the seed value to a variable S, a user-programmed lower limit to a variable L, and a user-programmed upper limit to a variable U. An iteration counter l is also initialized to zero.

The iteration counter l is incremented by one in block 414. Then, in block 403, the seed value in S is compared to the upper limit U. If the value S is greater than the user-programmed upper limit U, S is divided by 2 in block 404. The iteration counter l is then compared to a predetermined value n in block 409. If the iteration counter has not yet reached the value N, the iteration counter is once again incremented in block 414, and the value of S is again tested. If, however, the iteration counter l has reached the predetermined value, fine adjustment operations are performed beginning at block 410 that will be described in more detail later.

If the result of the test in block 403 is negative, indicating that the seed value is not greater than the upper limit, the algorithm proceeds to block 405, where the value in S is compared to the lower limit L. If the current value of S is less than the user-programmed lower limit, variable S is multiplied by 2 in block 406, and the iteration counter is tested in block 409 as described above. If, on the other hand, the current value of S is not less than the user-programmed lower limit, the value in S is transferred to variable RV in block 407, where it becomes the current output of the RV generator. The algorithm then terminates at block 408.

The iteration counter l, which is tested in block 409, modifies the operation of the algorithm from a coarse adjust mode (multiplying or dividing by two) to a fine adjust mode. When the test of the iteration counter indicates that l has reached the predetermined value N, and the value of S is still not within the constraints imposed by the user-programmed limits, the value of S is once again tested in block 410 to determine is S is greater than the upper limit. If so, then S is decremented by one in block 411 and the test is repeated. If the result of the test in block 410 indicates that the value S is less that the upper limit, S is subjected to another test in block 412 to see if the value is below the lower limit. If S is indeed below the user-programmed lower limit, S is incremented by 1 in block 413 and the test in block 410 is repeated. When the test in block 412 finally yields the result that S is not below the lower limit, the value in S becomes the output of the RV generator (block 407) and the algorithm terminates as described above.

Coarse and fine adjust modes are provided in the RV generator algorithm to prevent thrashing that may occur if values of the user-programmed upper and lower limits are too close together to permit exit from the coarse adjust portion of the algorithm (i.e., within a two-to-one ratio of each other).

What is claimed is:

1. In a transmitter that transmits first message signals provided by a first signal source, an improvement comprising:
   second signal source means for providing second message signals to the transmitter for at least part of the time when the first message signals are absent, wherein duration of transmissions and time between transmissions of the second message signals are derived from said second message signals.

2. The improvement of claim 1, wherein the first message signals comprise, at least in part, encrypted voice messages.

3. The improvement of claim 1, wherein the second message signals comprise, at least in part, dummy traffic.

4. In a secure communication unit having a transmitter and a plurality of other signal sources, an apparatus that provides a bit stream to the transmitter from time to time, wherein the bit stream is transmitted for variable durations and with variable times between transmissions, the apparatus comprising:
   bit generator means for generating the bit stream;
   at least one variable generator means for generating the variable durations and the variable times between transmissions using the bit stream as input;
   switch means for selecting among the bit stream and the other signal sources;
   real time clock and control means for controlling the switch means in response to a combination of the other signal sources and said at least one variable generator means.

5. The apparatus according to claim 4, wherein the bit generator means comprises a linear feedback shift register.

6. The apparatus according to claim 5, wherein an initial value is provided for the linear feedback shift register.

7. The apparatus according to claim 4, wherein said at least one variable generator means is responsive to upper and lower limit information.

8. The apparatus according to claim 7, wherein said at least one variable generator means operates on the bit stream in accordance with said upper and lower limit information to provide duration and time between transmission information that falls within said upper and lower limits.

9. The apparatus of claim 4, wherein the real time clock and control means operates the switch means to select one of the other signal sources while the bit stream is being transmitted whenever activity is detected from one of the other signal sources.

10. In a secure communication unit having a transmitter and a plurality of other signal sources, an apparatus that provides a bit stream to the transmitter from time to time, therein the bit stream is transmitted for variable durations and with variable times between transmissions, the apparatus comprising:
    bit generator means for generating the bit stream;
    at least one variable generator means for generating the variable durations and the variable times between transmissions using the bit stream as input.

11. In a secure communication unit having a transmitter and a plurality of other signal sources, a method for providing a bit stream to the transmitter from time to time, wherein the bit stream is transmitted for variable durations and with variable times between transmissions, the method comprising the steps of:
    (a) generating the bit stream;
    (b) generating the variable durations and the variable times between transmissions using said bit stream as input; and
    (c) selecting among the bit stream and the other signal sources, for provision to the transmitter, in response to a combination of the other signal sources and the variable durations and times between transmissions generated in step (b).

12. The method in accordance with claim 11, wherein the bit stream of step (a) is generated by a linear feedback shift register.

13. The method in accordance with claim 12, wherein an initial value is provided for the linear feedback shift register.

14. The method in accordance with claim 11, wherein the step (b) of generating the variable durations and the variable times between transmissions comprises operating on the bit stream of step (a) in accordance with upper and lower limit information to provide durations and times between transmissions that fall within said upper and lower limits.

15. The method in accordance with claim 11, wherein the step (c) of selecting among the bit stream and the other signal sources comprises selecting one of said other signal sources while the bit stream is being transmitted whenever activity is detected from one of the other signal sources.

* * * * *